(12) United States Patent
Kassas et al.

(10) Patent No.: US 11,454,726 B2
(45) Date of Patent: Sep. 27, 2022

(54) INDOOR LOCALIZATION WITH LTE CARRIER PHASE MEASUREMENTS AND SYNTHETIC APERTURE ANTENNA ARRAY

(71) Applicant: The Regents of the University of California, Oakland, CA (US)

(72) Inventors: Zak Kassas, Irvine, CA (US); Ali Abdallah, Irvine, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 132 days.

(21) Appl. No.: 17/023,065

(22) Filed: Sep. 16, 2020

(65) Prior Publication Data

US 2021/0109232 A1  Apr. 15, 2021

Related U.S. Application Data

(60) Provisional application No. 62/913,074, filed on Oct. 9, 2019.

(51) Int. Cl.
| | |
|---|---|
| *G01S 19/00* | (2010.01) |
| *G01S 19/22* | (2010.01) |
| *H04B 7/08* | (2006.01) |
| *G01S 19/42* | (2010.01) |
| *H04W 4/33* | (2018.01) |

(52) U.S. Cl.
CPC ............ *G01S 19/22* (2013.01); *G01S 19/428* (2013.01); *H04B 7/086* (2013.01); *H04W 4/33* (2018.02)

(58) Field of Classification Search
CPC ........ G01S 19/22; G01S 19/428; H04W 4/33; H04B 7/086
See application file for complete search history.

(56) References Cited

U.S. PATENT DOCUMENTS

| | | | | |
|---|---|---|---|---|
| 2008/0248741 | A1* | 10/2008 | Alizadeh-Shabdiz | ....................... H04W 64/006 455/456.1 |
| 2013/0154880 | A1* | 6/2013 | Dickman | ................ G01S 19/36 342/357.59 |
| 2016/0135007 | A1* | 5/2016 | Persson | ................. H04W 4/023 455/456.2 |
| 2019/0289426 | A1* | 9/2019 | Persson | .................... G01S 3/46 |

OTHER PUBLICATIONS

Ali A. Abdallah, Kimia Shamaei, and Zaher M. Kassas (Indoor Localization with LTE Carrier Phase Measurements and Synthetic Aperture Antenna Array, Sep. 16-20, 2019) (Year: 2019).*

* cited by examiner

*Primary Examiner* — Khai M Nguyen
(74) *Attorney, Agent, or Firm* — John P. Teresinski; Stites & Harbison PLLC

(57) ABSTRACT

A spatial approach is provided to mitigate multipath error for an indoor pedestrian localization system using broadband communication signals, such as cellular long-term evolution (LTE) carrier phase measurements. Motion of a receiver may be used to synthesize an antenna array from time-separated elements. Received data may then be combined for synthetic aperture navigation that allows for suppressing multipath error based on determination of direction-of-arrival (DOA) of the incoming communication (e.g., LTE) signals. In one embodiment, navigation observables may be determined based on determined direction of arrival.

20 Claims, 10 Drawing Sheets

Algorithm 1: Standard ESPRIT

1: Collect data samples $\mathbf{H}^{(K)}$
2: Estimate the input covariance matrix $\hat{\mathbf{R}}_{HH}$ as in (7)
3: Estimate the order of the system $\hat{L}+1$, which will be discussed later in the paper
4: Perform singular value decomposition $\mathbf{H}^{(K)} = \mathbf{U}\boldsymbol{\Sigma}\mathbf{V}^H$ and compute $\mathbf{U}_s$ with the $L+1$ dominant left singular values
5: Solve, using the total least squares approach, the invariance equation that is given as $$\mathbf{J}_1 \mathbf{U}_s \zeta = \mathbf{J}_2 \mathbf{U}_s,$$

where $\mathbf{J}_1 = [\mathbf{I}_{KN-1 \times KN-1}\ 0]$ and $\mathbf{J}_2 = [0\ \mathbf{I}_{KN-1 \times KN-1}]$
6: Calculate the eigenvalues of the resulting complex-valued solution $$\zeta = \mathbf{T}\boldsymbol{\Phi}\mathbf{T}^{-1},$$

with $\text{diag}\{\phi_1, \cdots, \phi_D\}$.
7: Extract the angular information via $$\mu_d = \arg(\phi_d)$$

$$\phi_d = \arcsin\left(\frac{-\lambda}{2\pi d}\mu_d\right)$$

*FIG. 7*

INDOOR LOCALIZATION WITH LTE CARRIER PHASE MEASUREMENTS AND SYNTHETIC APERTURE ANTENNA ARRAY

CROSS REFERENCE TO RELATED APPLICATION

This application claims priority to U.S. Provisional Application No. 62/913,074 titled INDOOR LOCALIZATION WITH LTE CARRIER PHASE MEASUREMENTS AND SYNTHETIC APERTURE ANTENNA ARRAY filed on Oct. 9, 2019, the content of which is expressly incorporated by reference in its entirety.

STATEMENT OF GOVERNMENT SUPPORT

This invention was made with Government support under Grant No. 70NANB17H192, awarded by the National Institute of Standards and Technology and the U.S. Department of Commerce. The Government has certain rights in the invention.

FIELD

The present disclosure generally relates to a Long-Term Evolution Synthetic Aperture Navigation (LTE-SAN) framework for locating a navigator receiver indoors.

BACKGROUND

It is estimated that people spend an overwhelming majority of their time indoors. For example, Americans spend 90% of their time indoors on average. As such, indoor localization technology has important societal and economic impact. On one hand, it could be the difference between life and death in emergency situations (e.g., fire, earthquake, law enforcement, etc.). On the other hand, it could save a considerable amount of lost time and effort in malls, airports, hospitals, and storage facilities.

Despite its importance, no single technology has emerged as a clear winner in solving the indoor localization problem. Sensor-based technology (e.g., LIDAR, sonar, inertial measurement units, and vision) can only provide local position estimates. Moreover, these sensors tend to be bulky and impractical to mount on a human. Also, these sensors may not function in all environments (e.g., smoke, dark, etc.). Signal-based technology (e.g., active radio frequency identification, WiFi, Bluetooth, ultra wideband, and cellular) alleviates the sensor-based technology shortages, but some require installing a dedicated infrastructure, while others are only able to produce a coarse position estimate.

Among different signal-based technologies, cellular long-term evolution (LTE) signals appear to be very attractive due to their geometric diversity, abundance, high received power, and high received carrier-to-noise ratio ($C/N_0$): a $C/N_0$ between 55-80 dB-Hz was observed in different indoor environments. Moreover, LTE signals possess a high bandwidth (up to 20 MHz), which yields a more precise time-of-arrival (TOA) estimate. Indoor positioning capabilities with cellular LTE signals have been the subject of recent research. In "Indoor positioning based on LTE carrier phase measurements and an inertial measurement unit" (Abdallah), LTE carrier phase measurements were fused with an inertial measurement unit (IMU) in a tightly-coupled fashion, producing a two-dimensional (2D) root mean-squared error (RMSE) of 3.52 m over a 109 m indoor trajectory. In "Indoor positioning using LTE signals," different approaches for extracting TOA of LTE signals indoors have been evaluated, where the final navigation solution showed a 2-D positioning RMSE of 8 m with a 50% circular error probability exploiting 4 base stations (also known as evolved Node Bs or eNodeBs). A particle filter was used in "Particle filter based positioning with 3GPP-LTE in indoor environments" with laboratory-emulated LTE signals, assuming synchronized eNodeBs which provided a position RMSE of 5.35 m.

However, there are two main challenges associated with exploiting LTE signals for indoor localization: (1) multipath delays indoors can be small compared to the inverse bandwidth of the signal, which limits methods that rely on the TOA to discriminate multipath from line-of-sight (LOS) and (2) the clock biases of LTE eNodeBs are unknown to the receiver. The second challenge has been addressed by introducing a rover/base framework.

There is a desire for systems, processes, and configurations to utilize LTE signals for indoor localization.

BRIEF SUMMARY OF THE EMBODIMENTS

The disclosure is directed to systems and processes for indoor navigation based on broadband signals. One embodiment is directed to a method for carrier phase measurement and synthetic aperture navigation for an indoor localization system. The method includes receiving, by a device, a broadband communication signal from an antenna for a first position of the device, and receiving, by the device, a broadband communication signal from the antenna for a second position of the device. The method also includes processing, by the device, received broadband communication signals by performing a carrier phase measurements for each position of the device, and determining, by the device, a direction of arrival (DOA) of received broadband communication signals relative to the antenna based on the processing and measurements for each position, wherein multipath error is suppressed based on determined (DOA) of received broadband communication signals. The method also includes outputting, by the device, a navigation observable based on determined direction of arrival.

In one embodiment, broadband communication signals are cellular long-term evolution (LTE) signals, and wherein the broadband communication signal for the first position relates to a first time instant and the broadband communication signal for the second position relates to a second time instant.

In one embodiment, performing a carrier phase measurement includes tracking a cell-specific reference signal (CRS) in received frames of a broadband communication signal and estimating channel impulse response (CIR).

In one embodiment, determining direction of arrival (DOA) of received broadband communication signals includes estimating all paths from the receiver including line of sight and non-line of sight, selecting line of sight path, performing a beam forming operation to combine line of sight contributions and suppress multipath error and processing the beamformed signal to determine the navigation observable.

In one embodiment, determining a direction of arrival (DOA) of received broadband communication signals includes performing a symmetric geometric pattern and invariance transformation including dividing a synthetic antenna array in to subarrays In one embodiment, determining a direction of arrival (DOA) of received broadband communication signals includes performing a spatial smoothing operation to divide a synthetic array into smaller subarrays and determining data covariance matrices from averaging of subarrays.

In one embodiment, multipath error is suppressed by applying a minimum variance distortionless (MVDR) beamformer operation.

In one embodiment, an extended Kalman filter (EKF) operation is performed to estimate a state vector from corrected carrier phase measurements.

In one embodiment, determining, by the device, a direction of arrival (DOA) of received broadband communication signals includes obtaining updated channel input response determination by at least one of a feedforward coupling scheme and feedback coupling scheme.

In one embodiment, the navigation observable is at least one of pseudorange and accumulated carrier phase.

Another embodiment is directed to a device configured for carrier phase measurement and synthetic aperture navigation for an indoor localization system. The device includes a communications module configured to receive a broadband communication signal from an antenna for a first position of the device, and receive a broadband communication signal from the antenna for a second position of the device. The device includes a controller coupled to the communications module, wherein the controller is configured to process received broadband communication signals by performing a carrier phase measurements for each position of the device. The controller is also configured to determine a direction of arrival (DOA) of received broadband communication signals relative to the antenna based on the processing and measurements for each position, wherein multipath error is suppressed based on determined (DOA) of received broadband communication signals. The controller is also configured to output a navigation observable based on determined direction of arrival.

Other aspects, features, and techniques will be apparent to one skilled in the relevant art in view of the following detailed description of the embodiments.

BRIEF DESCRIPTION OF THE DRAWINGS

The features, objects, and advantages of the present disclosure will become more apparent from the detailed description set forth below when taken in conjunction with the drawings in which like reference characters identify correspondingly throughout and wherein.

Figure 5A:
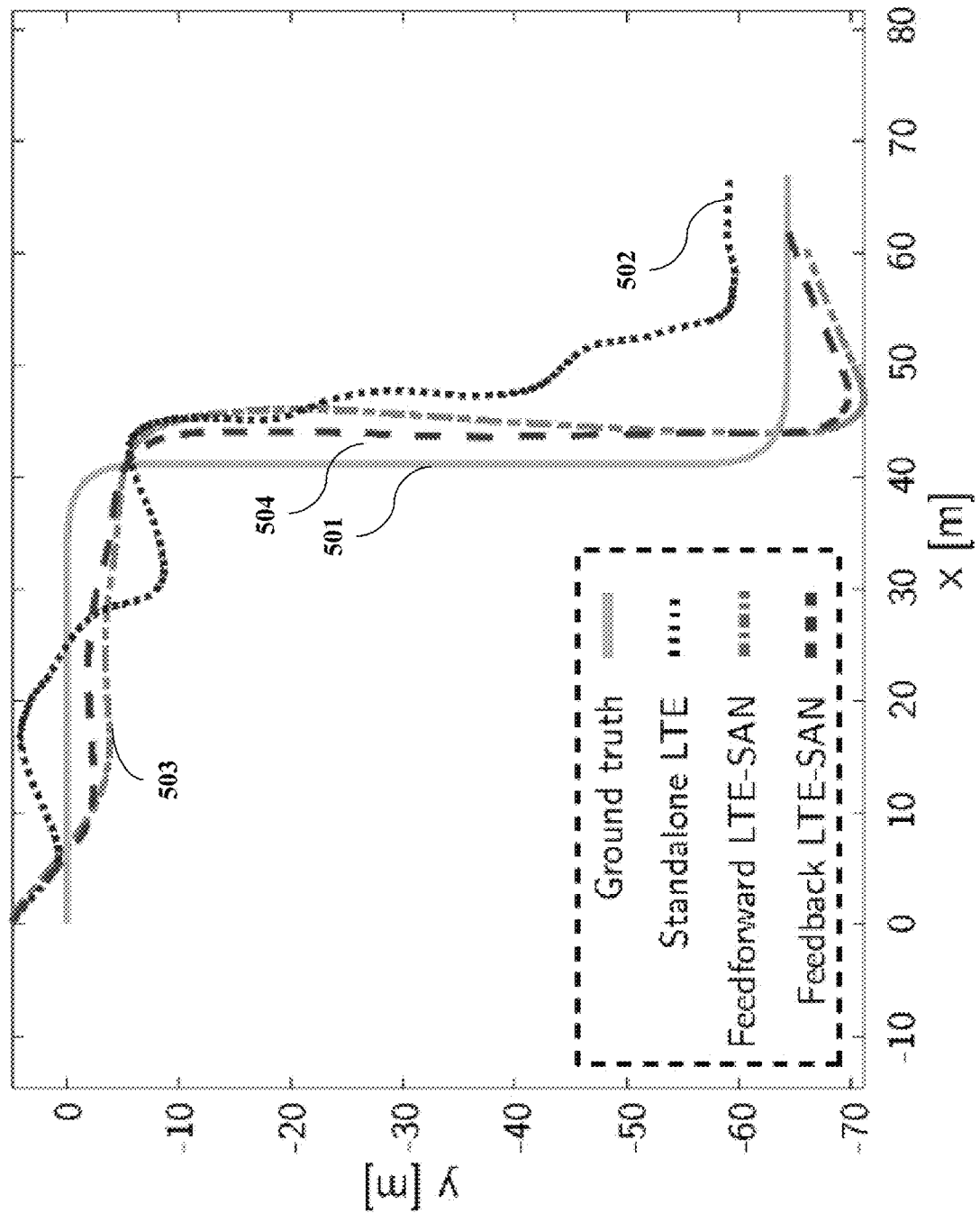
Figure 5B:
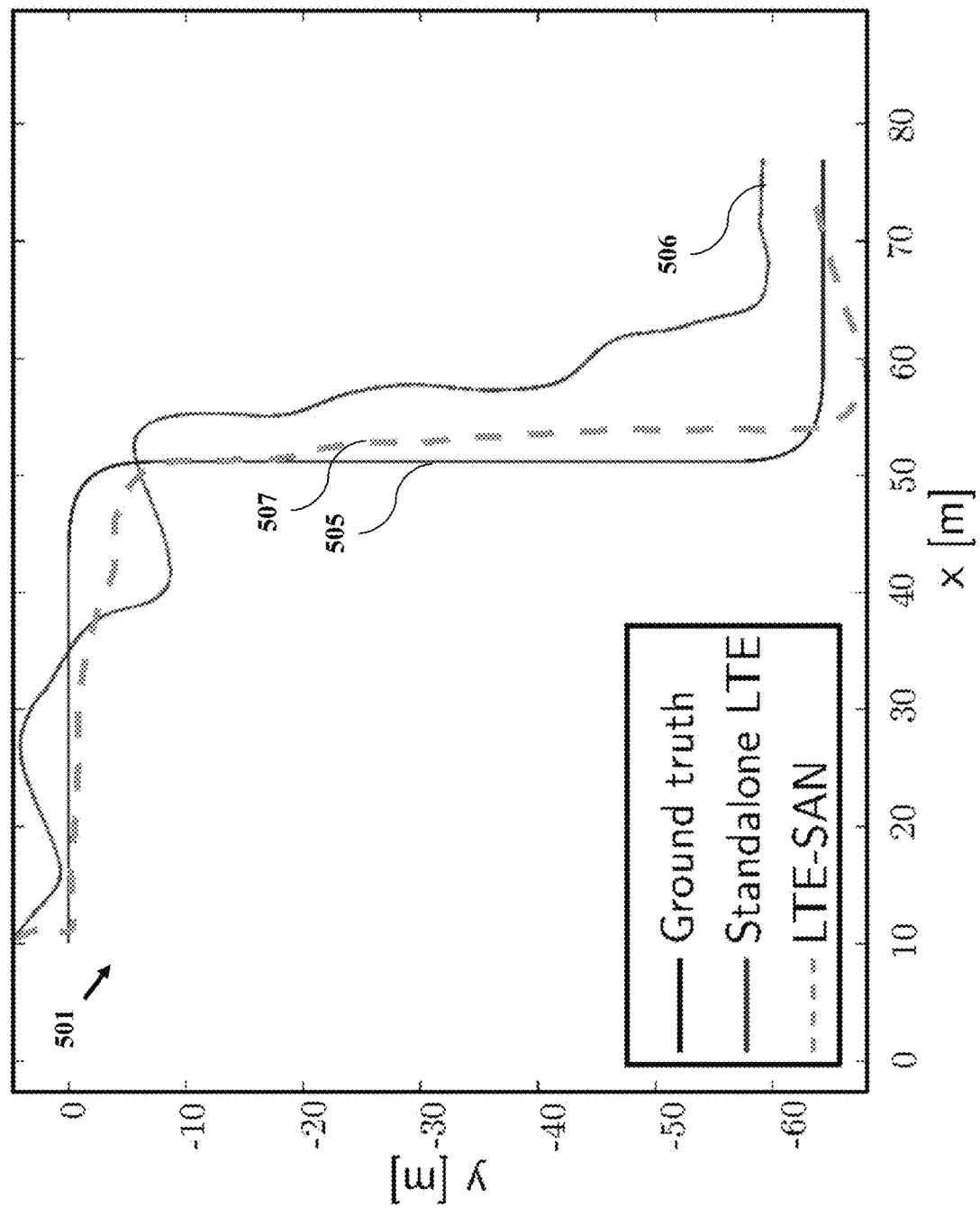
Figure 6:
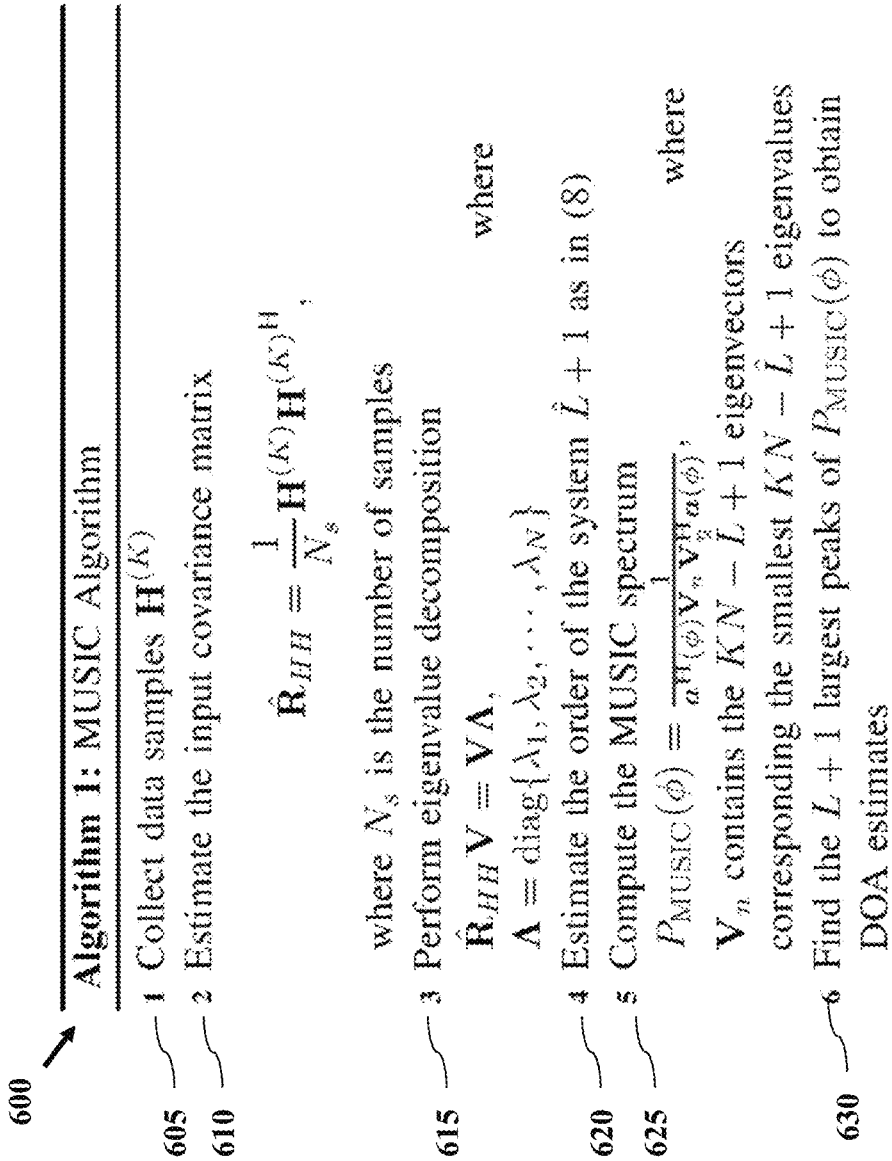

4B illustrates embodiments of device configuration according to one or more embodiments;

FIGS. 5A-5B illustrates graphic representations of ground truth trajectory compared to navigation solutions according to one or more embodiments;

FIG. 6 is illustrates a process for a Multiple Signal Classification (MUSIC) according to one or more embodiments; and FIG. 7 illustrates a process for an exemplary estimation of signal parameters via rotational invariance techniques (ESPRIT) function according to one or more embodiments.

DETAILED DESCRIPTION OF THE EXEMPLARY EMBODIMENTS

Overview and Terminology

One aspect of the disclosure is directed to indoor localization using broadband communication signals such as cellular long-term evolution (LTE). Processes and device configurations are provided for a spatial approach to minimize multipath error of broadband communication signals. In one embodiment, configurations are provided that utilize cellular long-term evolution (LTE) carrier phase measurements and synthetic aperture navigation (SAN)—LTE-SAN. In one exemplary embodiment, a framework is provided to spatially separate incoming LTE signals by exploiting antenna motion and/or received motion relative to an antenna, to estimate the direction-of-arrival (DOA) of received signals. By way of further example, the proposed approach exploits the motion of a receiver to synthesize an antenna array from time-separated elements. Synthesized data received by the synthetic antenna array may be processed to suppress multipath signals based on determination of the direction-of-arrival (DOA) of incoming LTE signals. The disclosure additionally provides two coupling schemes for LTE-SAN: feedforward and feedback.

One embodiment is directed to a process that includes receiving a broadband communication signal for a receiver at different positions and performing one or more measurements, such as carrier phase measurement, to provide synthetic aperture navigation. Received signals may be utilized to determine a navigation observable based on determined direction of arrival (DOA). A synthetic aperture navigation (SAN) framework is provided to mitigate the effect of multipath signals and minimize the multipath-induced errors. One way to differentiate between multipath signals and line of sight (LOS) signals is through the direction of arrival of the signals. The use of a synthetic aperture antenna can circumvent the need for a large antenna aperture as the physical size of a large antenna may not be practical for personal navigation handhold devices This disclosure identifies several advancements including: (1) implementation of a feedforward and feedback LTE-SAN navigation framework using an extended Kalman filter (EKF), (2) characterization of the proposed system's parameters, (3) evaluation of different parts of the framework with LTE simulated data, and (4) validation of the framework experimentally based on real LTE data.

It should be appreciated that the principles of the disclosure are not limited to long term evolution networks (LTE) and may be applied to other communication protocols.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

Exemplary Embodiments

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Synthetic Aperture Navigation and Beamforming Process

Figure 1A:
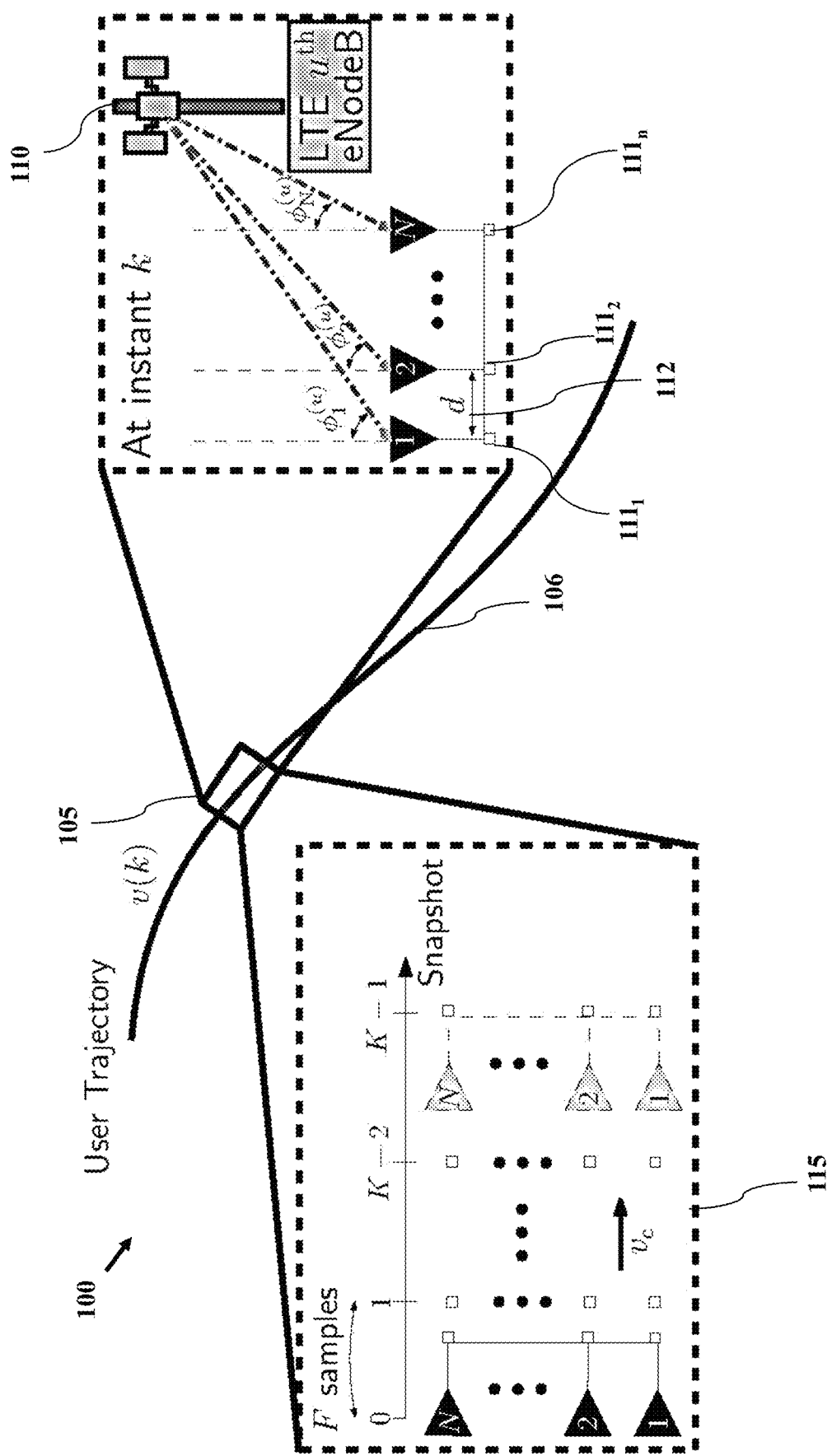
FIG. 1A is a graphical representation of a Long-Term Evolution Synthetic Aperture Navigation (LTE-SAN) configuration according to one or more embodiments.

One or more embodiments are directed to the problem of multipath mitigation via spatial separation of received LTE signals for a pedestrian indoor localization system. FIG. 1A is a graphical representation of a Long-Term Evolution Synthetic Aperture Navigation (LTE-SAN) configuration according to one or more embodiments.

One principle of a synthetic aperture antenna is to capture signals from a moving single-element antenna at different instants. FIG. 1A is a graphical illustration depicting an exemplary embodiment of a synthetic uniform linear array, an associated user trajectory, the sampling process of the moving antenna, and a snapshot of the azimuth angles impinging on the antenna array from the u-th eNodeB at instant k.

FIG. 1A illustrates device 105 which may include a receiver and having a trajectory 106 (e.g., user trajectory) that may be characterized as having a linear velocity. Device 100 may be part of a system 100 including one or more antennas, such as antenna 110. In one embodiment, measurements taken by device 105 at different time instants correspond to different antenna positions. FIG. 1A illustrates broadband communication signals $111_{1-n}$ received by device 105 from antenna 110. Signal $111_1$ may relate to a signal received as at first position of device 105 and signal $111_2$ may relate to a signal received at a second position, separated a distance 112 from the first position. According to one embodiment, additional signals separated from at least one additional distance may be performed up until having a plurality, for example K, time-separated positions with specific configurations. In one embodiment, measurements 115 are combined and processed as if they were obtained from antenna 110 with multiple spatially distributed elements. FIG. 1A illustrates a graphical representation of utilizing an antenna array. According to one embodiment, antenna arrays (physical or synthetic) may be advantageous as: (1) they are not limited by the signal bandwidth to resolve multipath delays as it is capable of resolving DOA of received signals, (2) they are not limited to cases when LOS is stronger than multipath signals, and (3) in the case of synthetic antenna arrays, they do not require a large physical antenna, and instead, they rely on signal processing algorithms to achieve their objective.

According to one embodiment, device 105 may be configured to perform a SAN algorithm/process for measurements 115. In one embodiment, a SAN algorithm performs the following steps: (1) estimate all paths (LOS and NLOS) in the received signal, (2) select the LOS among all paths, (3) beamform to coherently combine LOS contributions and suppress multipath, and finally (4) process the beamformed signal to estimate the parameters of interest for navigation, such as pseudorange and accumulated carrier phase. A SAN approach as described herein can remove multipath effects and remove/limit distortion in measurements.

FIG. 1A illustrates performing spatial separation using a synthetic antenna array. The analysis assumes a linear movement of the pedestrian for a typically short duration of time $t_{lin}=KFt_{frame}$, where K is the is the number of snapshots, F is the number of skipped LTE frames to account for the physical separation between two consecutive snapshots, N is the number of antenna elements which could any number greater than or equal to one, and $t_{frame}$ is the LTE frame duration defined as $t_{frame}=0.01$ seconds. For this period of time, the speed is assumed to be constant and defined as $v_c$ which is estimated in the navigation filter by taking the average over $t_{lin}$. In one embodiment, the altitude of mounted-receiver is estimated using an external sensor (e.g., a barometer). Therefore, only the 2-dimensional (2-D) position, 2-D velocity, and the azimuth angles $\{\phi_l^{(u)}\}_{l=0}^{L^{(u)}}$ of the impinging signals (both LOS and multipath signals) from the u-th eNodeB are estimated as shown in FIG. 1, where $L^{(u)}$ is the number of multipath components. FIG. 1A illustrates a LTE-SAN approach with a synthetic uniform linear antenna array and shows the user trajectory, the sampling process of the moving antenna along with the azimuth angles impinging on the antenna array from the u-th eNodeB at instant k. The following subsections present the LTE-SAN model, discuss DOA estimation using a subspace-based technique, analyze the beamforming process to mitigate multipath, and formulate the navigation filter.

Figure 1C:
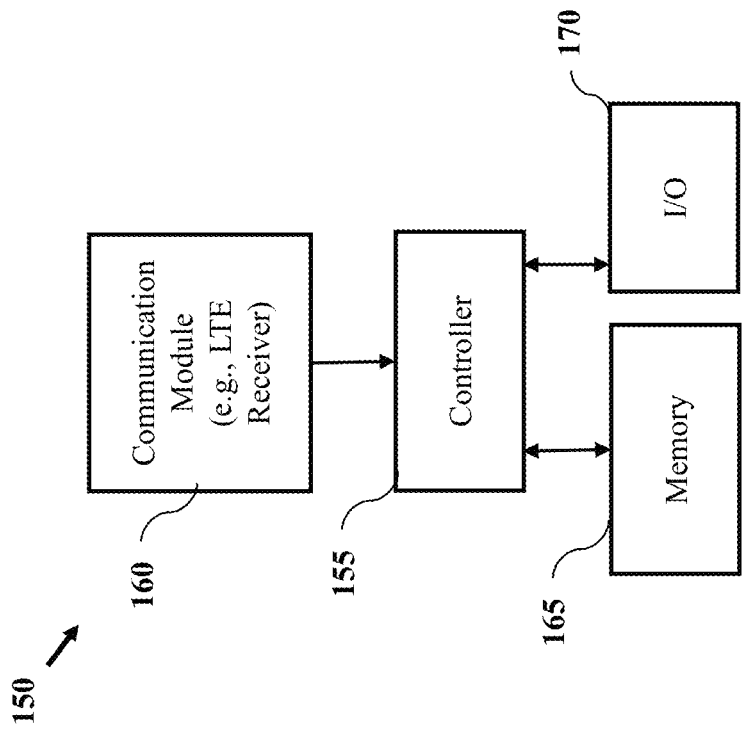
FIG. 1C illustrates a device configuration for carrier phase measurement and synthetic aperture navigation for an indoor localization system according to one or more embodiments.
Figure 1B:
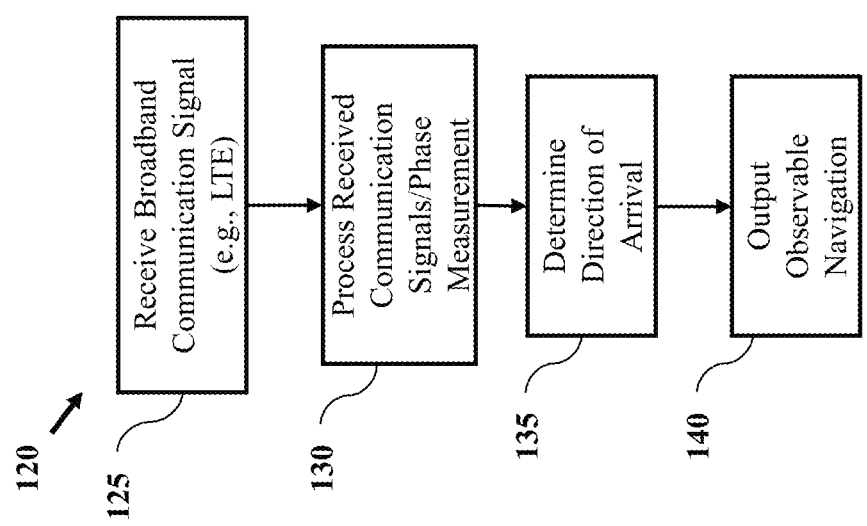
FIG. 1B illustrates a process for carrier phase measurement and synthetic aperture navigation for an indoor localization system according to one or more embodiments.

FIG. 1B illustrates a process for carrier phase measurement and synthetic aperture navigation for an indoor localization system according to one or more embodiments. According to one embodiment, process 120 may be performed by a device, such as device 105. Process 120 may allow for an indoor localization which uses cellular long-term evolution (LTE) carrier phase measurements and synthetic aperture navigation (SAN) approach. The framework spatially separates the incoming LTE signals by exploiting antenna motion to estimate the direction-of-arrival (DOA). The proposed approach exploits the motion of the receiver to synthesize an antenna array from time-separated elements.

Process 120 may be initiated by a receiver (e.g., device 105) receiving a broadband communication signal from an antenna for a first position of the device at block 125. The device may be configured to receive a broadband communication signal from the antenna for a second position of the device at block 125. Broadband communication signals received at block 125 may be cellular long-term evolution (LTE) signals. The broadband communication signal for the first position may relate to a first time instant and the broadband communication signal for the second position relates to a second time instant. Embodiments may be configured to provide a synthetic aperture antenna by capturing signals from a moving single-element antenna at different instants.

At block 130, process 120 performs processing of received broadband communication signals by performing a carrier phase measurements for each position of the device.

In one embodiment. According to one embodiment, performing a carrier phase measurement includes tracking a cell-specific reference signal (CRS) in received frames of a broadband communication signal and estimating channel impulse response (CIR).

At block 135, process 120 includes determining, by the device, a direction of arrival (DOA) of received broadband communication signals relative to the antenna based on the processing and measurements for each position. The multipath error may be suppressed based on determined direction of arrival (DOA) of received broadband communication signals. According to one embodiment, determining direction of arrival (DOA) of received broadband communication signals includes estimating all paths from the receiver including line of sight and non-line of sight, selecting line of sight path, performing a beam forming operation to combine line of sight contributions and suppress multipath error and processing the beamformed signal to determine the navigation observable. References to multipath may refer to a propagation phenomenon that results in radio signals reaching a receiving antenna by two or more paths. Multipath as used herein may refer to multipath signals and/or multipath error as a result of receiving multiple signals. According to another embodiment, determining a direction of arrival (DOA) of received broadband communication signals includes performing a symmetric geometric pattern and invariance transformation including dividing a synthetic antenna array in to subarrays, which is described in more detail below with reference to FIGS. 2A-2C. According to another embodiment, determining a direction of arrival (DOA) of received broadband communication signals includes performing a spatial smoothing operation to divide a synthetic array into smaller subarrays and determining data covariance matrices from averaging of subarrays. Multipath error may be suppressed by applying a minimum variance distortionless (MVDR) beamformer operation. In certain embodiments, an extended Kalman filter (EKF) operation is performed to estimate a state vector from corrected carrier phase measurements. According to yet another embodiment, determining a direction of arrival (DOA) of received broadband communication signals includes obtaining updated channel input response determination by at least one of a feedforward coupling scheme and feedback coupling scheme.

At block 140, process 120 includes outputting, by the device, a navigation observable based on determined direction of arrival. The navigation observable may be at least one of pseudorange and accumulated carrier phase measurement for use in determining position, and/or updating position in an indoor navigation determination.

FIG. 1C illustrates a device configuration for carrier phase measurement and synthetic aperture navigation for an indoor localization system according to one or more embodiments. According to one embodiment, device 150 may be configured for carrier phase measurement and synthetic aperture navigation for an indoor localization system. Device 150 may include controller 155, communications module 160, memory 165, and input/output (I/O) unit 170.

Controller 155 may relate to a processor or control device configured to execute one or more operations stored in memory 165, such as a framework for LTE-SAN. Controller 155 may be coupled to memory 165, I/O 170 and communication module 160. Communications module 160 may be configured to receive one or more broadband communication signals from one or more antennas including LTE signals.

Communications module 160 may be configured to receive a broadband communication signal from an antenna for a first position of device 150, and receive a broadband communication signal from the antenna for a second position of the device 150. Controller 155 may be coupled to the communications module 160. Controller 155 may be configured to process received broadband communication signals by performing a carrier phase measurements for each position of the device and determine a direction of arrival (DOA) of received broadband communication signals relative to the antenna based on the processing and measurements for each position, wherein multipath error is suppressed based on determined (DOA) of received broadband communication signals. Controller 155 may also be configured to output a navigation observable based on determined direction of arrival to I/O 170.

The remainder of the disclosure provides a description of a Synthetic Aperture Navigation and Beamforming Process in more detail and includes a discussion of a LTE-SAN framework. The discussion provides descriptions of (1) a LTE-SAN model, (2) DOA estimation using the estimation of signal parameters via rotational invariance techniques (ESPRIT), (3) multipath mitigation via Capon's beamformer, and (4) the navigation filter. The LTE-SAN Coupling section evaluates different steps in the beamforming process and analyzes the effect of different parameters on the proposed system using LTE simulated data. The Experimental Results sections validate experimentally the proposed LTE-SAN frameworks in an indoor environment and compare them with the standalone LTE approach.

LTE-SAN Model

In one embodiment, LTE carrier phase measurements are produced by tracking the cell-specific reference signal (CRS) in the received LTE signals using a carrier phase-based software defined receiver. In one embodiment, the channel impulse response (CIR) of the k-th received LTE frame is estimated for each sample at the tracking step and will be denoted as h(k). The proposed technique performs on the post-correlation, i.e., CIR of the CRS which is attractive due to high bandwidth of CRS which is the same as the LTE system bandwidth. The CIR of the received LTE signal from the u-th eNodeB at the k-th snapshot can be represented as $$h_n^{(u)}(k) = \sum_{l=0}^{L^{(u)}} \alpha_l^{(u)} \alpha_l(\phi_n^{(u)}) e^{-j2\pi f_c \tau_l^{(u)}}, \quad (1)$$

for $n=1,\ldots,N$ and $k=1,\ldots,K$, where $\alpha_l^{(u)}$ and $\tau_l^{(u)}$ are the attenuation factor and the delay of the l-th multipath component, $f_c$ is the carrier frequency, and $\alpha_l(\phi_n^{(u)})$ and $\alpha_0(\phi_n^{(u)})$ are the steering elements of the n-th antenna element of the l-th multipath and LOS components, respectively. The steering element determines the spatial representation of the incoming signal. In other words, it represents the phase delay experienced by the antenna element with respect to a specified origin, which is chosen here to be the 1-st antenna element. For instance, for N elements in an antenna array, with the n-th element having a position of $r_n = [x_n, y_n]^T$, the steering element for this specific element is calculated as $$\alpha_l(\phi_n^{(u)}) = e^{-j\{k,r_n\}},$$

where k is the wave vector that describes the phase variation of a plane wave and <a,b> denotes the dot-product of vectors a and b.

In one embodiment, the LOS steering element of the u-th eNodeB at the n-th antenna element is expressed as $$\alpha_0(\phi_n^{(u)}) = e^{(n-1)j\mu^{(u)}}, \quad (2)$$

where $$\mu^{(u)} = -\frac{2\pi}{\lambda}d$$

$\sin(\theta_1^{(u)})$ is the spatial frequency for the u-th eNodeB. To simplify notation, the superscript "$^{(u)}$" will be dropped for the rest of the document. Then, in one embodiment, the received signals are formulated as $$h(k)=A(k)x(k)+v(k), \quad (3)$$

where v is a noise parameter and modeled as a zero-mean white Gaussian and spatially uncorrelated sequence with covariance $\sigma^2 I_{N \times N}$ and $$A(k)=[a_0(\phi), \ldots, a_L(\phi)], \quad (4)$$

$$x(k)=[\alpha_0 e^{-2\pi f_c \tau_0}, \ldots, \alpha_L e^{-2\pi f_c \tau_L}]^T, \quad (5)$$

where $a_l(\phi)$ and $a_0(\phi)$ are the steering vectors of all N antenna elements of the l-th multipath and LOS components, respectively, which in one embodiment may be further expressed as $$a_0(\phi)=[1, e^{j\mu}, \ldots, e^{(N-1)j\mu}]^T,$$

$$a_l(\phi)=[a_l(\phi_1), \ldots, a_l(\phi_N)]^T, l=1, \ldots, L.$$

In one embodiment, the collected data at the different K snapshots, each separated by F frames, are stacked as $$H^{(k)}=[h^T(k), h^T(k+F), \ldots, h^T(k+KF)]^T, \quad (6)$$

where $H^{(K)}$ is a KN×1 vector of synthesized data, which captures the data that will be processed in the DOA algorithms and multipath mitigation in the rest of the disclosure. It is worth mentioning that if the number of multipath signals including the LOS signal is greater than the antenna array size (i.e., L+1>N), then the rank(A)<L+1; a unique solution of DOA does not exist due to DOF deficiency. Applying the synthetic aperture technique will increase the DOF, where the new DOF obtained from synthesizing signals become [NK].

DOA Estimation: MUSIC

Embodiments described herein can employ different DOA estimation methods. Each method has its own computational cost and resolution. Multiple Signal Classification (MUSIC) is an attractive choice in one embodiment due to its high resolution and uniformity of collected observables. MUSIC may relate to subspace-based technique that can be derived from the maximum likelihood of observed data. Geometrically speaking, subspace DOA techniques determine the signal parameters by finding the intersection of the array observations and the signal subspace. Computationally, this requires an extensive multi-dimensional search. In the presence of noise, this is even more complex and there could be no intersection between the signal subspace and the array elements' observations. To address this, a projection criterion may be introduced to deal with the mismatch that happens due to the presence of noise.

To simplify the subsequent derivations, in one embodiment, the vector $H^{(K)}$ defined in (6) is expressed as $$H^{(K)}=A^{(K)}x^{(K)}+v^{(K)} \quad (7)$$

where $$v^{(K)}=[v^T(k), v^T(k+F), \ldots, v^T(k+KF)]^T,$$

$$x^{(K)}=[x^T(k), x^T(k+F), \ldots, x^T(k+KF)]^T,$$

$$A^{(K)}=[A^T(k), A^T(k+F), \ldots, A^T(k+KF)]^T.$$

It should be mentioned that some fairly standard assumptions are assumed to hold: (1) the steering vectors are assumed to be linearly independent, i.e., signals are impinging from different directions and form a full rank matrix $A^{(K)}$, (2) the noise vector $v^{(K)}$ follows the assumptions stated in (3), i.e., zero-mean Gaussian uncorrelated noise with covariance $\sigma^2 I_{KN \times KN}$, and (3) the noise is uncorrelated with the received signals $x^{(K)}$, implying that $$R_{HH}=\mathbb{E}[H^{(K)}H^{(K)^H}]=A^{(K)}R_{xx}A^{(K)^H}+\sigma^2 I, \quad (8)$$

where $R_{HH}=\mathbb{E}[H^{(K)}H^{(K)^H}]$ is the autocovariance matrix. In one embodiment, the rank of $A^{(K)}R_{xx}A^{(K)^H}$ is L+1, and can be determined directly from the eigenvalues of $R_{HH}$. Consequently, it can be shown in one embodiment that a good estimator for the number of incident signals is $$\hat{L}+1=KN-\hat{q}, \quad (9)$$

where $\hat{q}$ is the number of repeated minimum eigenvalues $\lambda_{min}$ of the non-singular matrix $A^{(K)}R_{xx}A^{(K)^H}$ in the metric of the noise covariance matrix defined in (8). A process for a MUSIC algorithm is shown in FIG. 6.

DOA Estimation: Standard ESPRIT

Figure 2A:
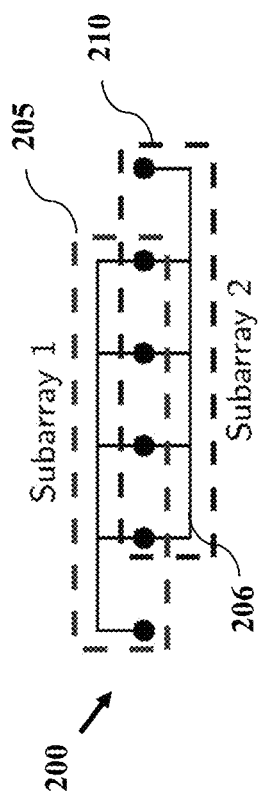
FIGS. 2A-2C are graphic illustrations of exemplary embodiments of different structures of ESPRIT subarrays according to one or more embodiments.
Figure 2B:
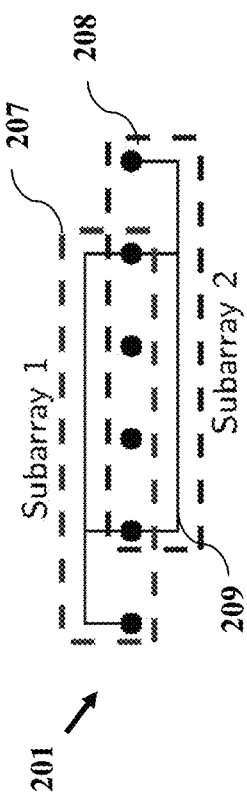
Figure 2C:
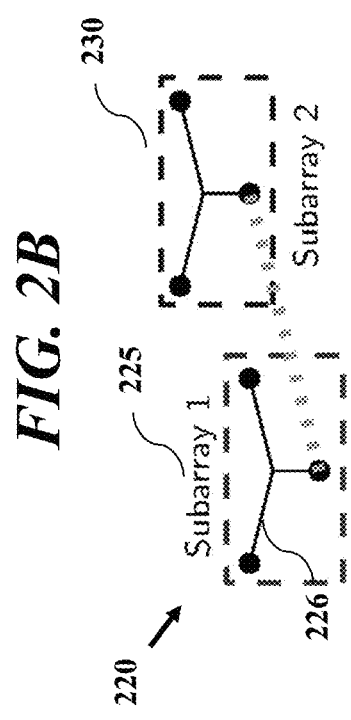

FIGS. 2A-2C are graphic illustrations of exemplary embodiments of different structures of ESPRIT subarrays according to one or more embodiments;

There are different DOA estimation methods of different embodiments that could be applied to get DOA estimates. Different algorithms have different performance, resolution, and computational cost. Subspace-based DOA estimation techniques had shown to have better resolution than the maximum-likelihood (ML) techniques. Subspace approach embodiments basically rely on the fact that the spatial covariance matrix (i.e., signals plus noise) of the received data spans two orthogonal subspaces, namely, the signal and noise subspaces, where the signal subspace is spanned with the larger eigenvalues of the data covariance matrix. MUSIC, discussed in the previous section, is one of the most popular and earliest proposed methods for super-resolution DOA estimation. MUSIC may show a high resolution performance when estimating DOA for LTE signals. However, MUSIC has a high computational cost. An alternative technique with a low computational cost and better high resolution capabilities is the ESPRIT algorithm. One embodiment of ESPRIT requires symmetric geometric pattern and invariance transformation characteristic for the applied antenna design to be applicable. In other words, ESPRIT divides the array into two symmetric subarrays as shown in FIGS. 2A-2C. The design shown in FIG. 2A is one structure and it is applied in the proposed framework while estimating DOA. FIG. 2A illustrates configuration 200 including first subarray 205 and second subarray 210 from antenna design 206 including linked antennas. FIG. 2B illustrates configuration 201 including first subarray 207 and second subarray 208 from antenna design 209 including linked outer antennas. FIG. 2C illustrates configuration 220 including first subarray 225 and second subarray 230 from antenna design 226 including antenna configuration 226.

In practice, the spatial covariance matrix $R_{HH}$ of the received LTE data in (6) is not known; however, in one embodiment, an estimate of $R_{HH}$ could be obtained as $$\hat{R}_{HH} = \frac{1}{N_s} H^{(K)} H^{(K)H}, \quad (10)$$

where $N_s$ is the number of samples and $H^{(K)H}$ is the Hermitian operator. A process for an ESPRIT algorithm is shown in FIG. 7.

1) Preprocessing Scheme: Spatial Smoothing

The DOA estimation algorithms described so far assume that the incoming signals are noncoherent. In other words, they assume that the steering matrix is full rank. If the impinging signals are highly correlated or coherent, different DOA estimation techniques will fail to provide reliable DOA estimates due to having an ill-conditioned or even singular spatial covariance matrix. In practical multipath scenarios, having highly correlated signals is very common where the incoming signals are scaled and delayed versions of each other. To overcome this challenge, in one embodiment, the data covariance matrix is preprocessed before "feeding" it to the DOA estimation algorithm. Two well-known and established preprocessing schemes deal with this challenge: (1) Forward-Backward Averaging (FB-averaging) and (2) Spatial Smoothing (SS). FB-averaging is capable to resolve only for the case of two coherent signals. However, in rich multipath area, the data may encounter more than two coherent signals. This raises the need of a more sophisticated approach to resolve this challenge. To this end, spatial smoothing seems to be an attractive technique to tackle this issue. In one embodiment, spatial smoothing divides the antenna array into a smaller number of subarrays (i.e., C) and the data covariance matrices obtained from each subarray are averaged. In one embodiment, for one-dimensional SS, e.g, ULA is divided into $N_{sub}=KN-C+1$ subarrays to decouple eigenvectors of at most C coherent signals. In one embodiment, the mathematical implementation of the new data for SS is expressed as $$H_{ss}^{(K)} = [H_{fss}^{(K)} H_{bss}^{(K)}],$$

where $H_{fss}^{(K)}$ and $H_{bss}^{(K)}$ are the forward and the backward spatially smoothed data that are defined as $$H_{fss}^{(K)} = [J_{f_1} H^{(K)} J_{f_2} H^{(K)} \cdots J_{f_c} H^{(K)}]$$

$$H_{bss}^{(K)} = [J_{b_1} H^{(K)} J_{b_2} H^{(K)} \cdots J_{b_c} H^{(K)}],$$

and $$J_{f_c} = [0_{N_{sub} \times (c-1)} I_{N_{sub}} 0_{N_{sub} \times (KN-N_{sub}-c+1)}] \in \mathbb{R}^{N_{sub} \times KN}$$

$$J_{b_c} = [0_{N_{sub} \times (KN-N_{sub}-c+1)} I_{N_{sub}} 0_{N_{sub} \times (c-1)}] \in \mathbb{R}^{N_{sub} \times KN}$$

for $c=1, \ldots, C$

Then, in one embodiment, the corresponding forward and backward spatially smoothed data covariance matrices are obtained as $$\hat{R}_{HH}^{fss} = \frac{1}{CN_s} H_{fss}^{(K)} H_{fss}^{(K)H}$$

$$\hat{R}_{HH}^{bss} = \frac{1}{CN_s} H_{bss}^{(K)} H_{bss}^{(K)H}.$$

Finally, in one embodiment, the overall spatially smoothed data covariance matrix is obtained by averaging both the forward and backward subarrays as $$\hat{R}_{HH}^{ss} = \frac{1}{2}(\hat{R}_{HH}^{fss} + \hat{R}_{HH}^{bss}).$$

Note that there exists a trade-off here between the number of coherent signals to be resolved and the new degree of freedom associated with the new subarray's size.

2) Model Order Estimates

In addition to the coherence issue of the incoming signals, the number of signals $L+1$ impinging on the array was assumed to be known so far. Practically, this number is unknown and has to be estimated from the data received. The simplest way of estimating the number of signals is by estimating the number of repeated small eigenvalues other than the large ones. In other words, if the multiplicity $\hat{q}$ of this smallest eigenvalues are found, an estimate of the number of signals, $\hat{L}+1$, can be obtained directly as $$\hat{L} = KN - \hat{q} - 1.$$

In practice, the smallest eigenvalues representing the noise power will not be identical. Instead, they will appear as a closely spaced cluster. This could be formed as a detection problem where the number of incoming signals obtained by a ULA is $L \in \{0, 1, \ldots, KN-1\}$. Two commonly used criteria: the minimum description length criterion (MDL) and Akaike information theoretic criterion (AIC) are used in one embodiment as estimation techniques to estimate the order of the system. In one embodiment, the number of signals after some algebra could be estimated to minimizes the following criteria depending on which criterion has been chosen $$MDL(L) = -\ln \left[ \frac{\prod_{i=L}^{KN} \lambda_i^{\frac{1}{KN-L-1}}}{\frac{1}{N-L-1} \sum_{i=L+2}^{KN} \lambda_i} \right]^{(KN-L-1)N_s} + \frac{1}{2} \hat{p}(K, N, L) \ln(N_s)$$

$$AIC(L) = -\ln \left[ \frac{\prod_{i=L+2}^{KN} \lambda_i^{\frac{1}{KN-L-1}}}{\frac{1}{KN-L-1} \sum_{i=L+2}^{KN} \lambda_i} \right]^{(KN-D)N_s} + \hat{p}(K, N, L)$$

where $\hat{p}(K,N,L)$ is a function of the number of independent parameters defined as the penalty function.

Multipath Mitigation

In one embodiment, in order to suppress multipath signals, the only signal that is allowed to pass through the beamformer is the LOS signal. In one embodiment, after applying beamforming to the synthetic data, the data received by array elements form a single output as follows $$y(k) = w^H H^{(K)}, \quad (11)$$

where w is a weighing vector that is determined by optimizing some objective function subject to certain constraints. Different beamforming methods have different criteria to optimize over. The common strategy behind beamforming is to steer the antenna array in a specified direction at a time and evaluate the specified objective seeking an optimal complex weighting vector to weight the received signals at different snapshots. Herein, the purpose behind the proposed LTE-SAN framework is to suppress the multipath components while passing the beam where the LOS component impinges on the synthetic antenna array. To do so, in one embodiment, different beamforming techniques could be applied. A potential beamforming technique embodiment is the Capon's method, or what is known as minimum variance distortionless response (MVDR) beamformer. In one embodiment, the chosen weighting vector for MVDR minimizes the variance of the array output signal while passing the signal arriving from the look direction with no distortion and could be derived as follows $$w = \frac{\hat{R}_{HH}^{-1} a_0(\phi)}{a_0^H(\phi) \hat{R}_{HH}^{-1} a_0(\phi)}, \quad (12)$$

where $a_0$ is the LOS steering vector. Therefore, in one embodiment, the new beamformed data y(k) is used to produce the new corrected measurements z'.

Another strategy is to steer the antenna array in the LOS direction by maximizing the signal-to-noise ratio (SNR). Assuming the noise entering each antenna element to be independent white Gaussian noise, in one embodiment, the SNR maximization problem of the beamformer could be expressed as $$\max_w \frac{w^H a_0' x_0 a_0' w^H}{w^H \sigma^2 I w}, \quad (13)$$

subject to $\|w\|_2 = 1$, $$w^H A^{(K)\prime} = 0_{1 \times L},$$

where $a_0' = [a_0^T(k), a_0^T(k+F), \ldots, a_0^T(k+KF)]^T$, $x_0$ is the LOS element in the received signal, and $A^{(K)\prime}$ is the multipath steering matrix (i.e., $A^{(K)}$ excluding $a_0'$). Assume $\alpha$ to be an arbitrary vector with $\|\alpha\|_2 = 1$, then w is defined as $$w = V_n' \alpha,$$

where span($V_n'$) $\perp$ span($A^{(K)\prime}$) and can be determined by taking the (N−1)K−L smallest eigenvectors with the (N−1)K−L smallest eigenvalues of $\hat{R}_{HH}$. An alternative way to express the maximization problem in (13) is $$\operatorname*{argmax}_w \frac{w^H a_0' x_0 a_0' w^H}{w^H \sigma^2 I w} = \operatorname*{argmax}_{\|\alpha\|_2 = 1} \frac{\alpha^H V_n'^H \hat{R}_{HH}' V_n' \alpha}{\sigma^2}, \quad (14)$$

where $\hat{R}'_{HH}$ is the same as $\hat{R}_{HH}$ after removing the last row and the last column. Then, $\alpha$ is obtained by finding the eigenvector corresponding to the largest eigenvalue of $V_n'^H \hat{R}'_{HH} V_n'$. Finally, in one embodiment, w is obtained and used in (11) to get the new CIR to be used for producing corrected observables.

Extended Kalman Filter

For one embodiment of the navigation filter, an EKF is used to estimate the state vector from the corrected LTE pseudo-measurements z'. In one embodiment, the altitude of the navigating receiver is assumed to be obtained using an external sensor (e.g., a barometer). Therefore, only the 2-D position r and velocity $\dot{r}$ of the pedestrian-mounted receiver are considered. In one embodiment, the EKF estimates the vector x defined as $$x = [x_{ped}^T, x_{clk}^T]^T,$$

with the pedestrian's state vector is defined as $x_{ped} \triangleq [r^T, \dot{r}^T]^T$. In one embodiment, the clock state vector $x_{clk}$ is defined as $x_{clk} \triangleq [c\delta t_1, c\dot{\delta t}_1, \ldots, c\delta t_U, c\dot{\delta t}_U]^T$, where U is the number of eNodeBs, c is the speed of light, and $\{\delta t_u\}$ and $\{\dot{\delta t}_u\}$ are the relative clock bias and drift between the receiver and u-th eNodeB. In one embodiment, the pedestrian's motion is assumed to evolve according to a nearly constant velocity dynamic, i.e., $$\ddot{r}(t) = \tilde{w}(t) \quad (15)$$

where w is a process noise vector, which is modeled as zero-mean white random process with power spectral density $Q_{ped}$. In one embodiment, the discrete-time process noise covariance matrix is given as $$Q_{ped} = \begin{bmatrix} \tilde{q}_x \frac{T^3}{3} & 0 & \tilde{q}_x \frac{T^2}{2} & 0 \\ 0 & \tilde{q}_y \frac{T^3}{3} & 0 & \tilde{q}_y \frac{T^2}{2} \\ \tilde{q}_x \frac{T^2}{2} & 0 & \tilde{q}_x T & 0 \\ 0 & \tilde{q}_y \frac{T^2}{2} & 0 & \tilde{q}_y T \end{bmatrix} \quad (16)$$

where $\tilde{q}_x$ and $\tilde{q}_y$ are the power spectral densities of the acceleration in the x- and y-directions. In one embodiment, the clock error dynamics are assumed to evolve according to $$\dot{x}_{clk} = A_{clk} x_{clk}(t) + \tilde{w}_{clk}(t), \quad A_{clk} = \begin{bmatrix} 0 & 1 \\ 0 & 0 \end{bmatrix}, \quad \tilde{w}_{clk} = \begin{bmatrix} \tilde{w}_{\delta t} \\ \tilde{w}_{\dot{\delta} t} \end{bmatrix}, \quad (17)$$

where the elements of $\tilde{w}_{clk}$ are modeled as zero-mean mutually independent white noise processes and the power spectral density of $\tilde{w}_{clk}$ is $\tilde{Q}_{clk} = \operatorname{diag}[S_{\tilde{w}_{\delta t}}, S_{\tilde{w}_{\dot{\delta} t}}]$.

LTE-SAN Coupling

Figure 3:
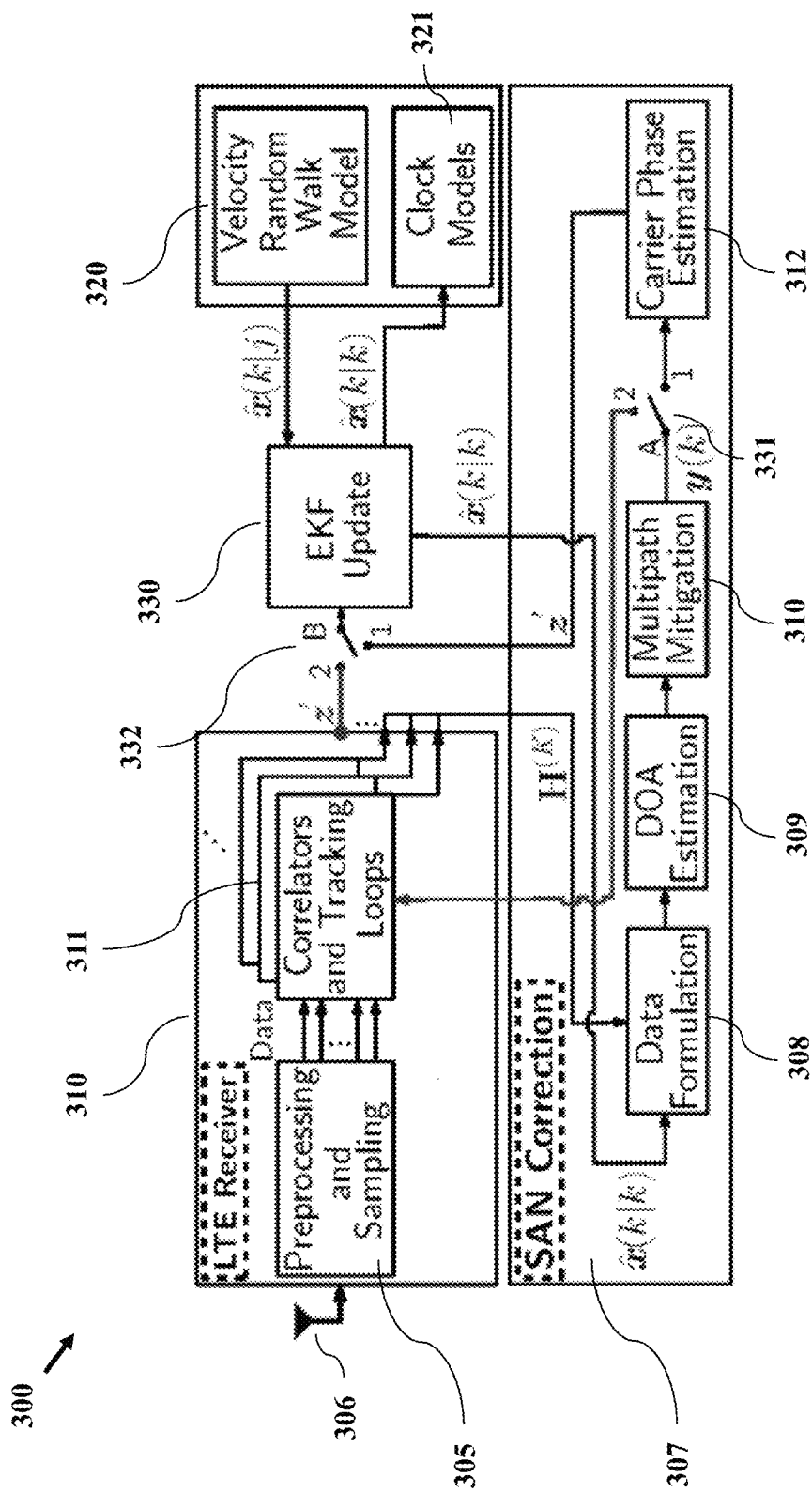
FIG. 3 is a block diagram of an exemplary embodiment of an LTE-SAN configuration according to one or more embodiments.

FIG. 3 is a block diagram of an exemplary embodiment of an LTE-SAN configuration according to one or more embodiments. According to one embodiment, processes (e.g., process 120) and device configurations (e.g., device 150) may employ a LTE-SAN configuration.

One embodiment of the proposed SAN method beamforms post correlation data and suppresses the effect of multipath signals to obtain new CIRs $\{y(k)\}_{u=1}^U$ with a dominant LOS peak. In one embodiment, the new CIRs obtained are used to produce the corrected Doppler frequency observables, denoted as $z' \triangleq [\hat{f}_{D_1}, \ldots, \hat{f}_{D_U}]^T$, to replace the old observables $z = [\hat{f}_{D_1}, \ldots, \hat{f}_{D_U}]^T$. This is achieved in one embodiment by coupling the LTE receiver with the SAN approach presented in the Synthetic Aperture Navigation and Beamforming Process section. This section presents two such coupling schemes: (1) feedforward LTE-SAN, and (2) feedback LTE-SAN.

LTE San configuration includes receiver 310 having a pre-processing and sampling block configured to receive signals as input from antenna 306. Pre-processed and sampled signals may be fed to correlators and tracking loops 311. Extended Kalman filter update block may receive input from velocity model block 320 and may output updates to clock models 321 SAN correction clock 307 may include data formulation block 308, DOA estimation clock 309, multipath mitigation block 310 and carrier phase estimation block 312.

Feedforward Coupling

According to one embodiment, coupling is achieved in a feedforward fashion as shown in FIG. 3, where the nodes A and B, shown as 331 and 332 respectively, are connected to their respective node 1. In one embodiment, the measurements z generated by the LTE carrier phase-based receiver 310 are processed in the proposed SAN algorithm of configuration 300. In one embodiment, the corrected measurements z' are fused with a velocity random walk statistical model 320 using the EKF 330 discussed in the "Extended Kalman Filter" section. Note that in FIG. 3, k and j are discrete-time instances where k>j.

Feedback Coupling

Here, the coupling is achieved in a feedback fashion as shown in FIG. 3, where the nodes A and B, shown as 331 and 332, are connected to their respective node 2. In one embodiment, the measurements z generated by the LTE carrier phase-based receiver 310 are processed in the proposed SAN algorithm 300. In practice, in one embodiment, CIR is estimated in the tracking loop 311 of the LTE receiver 310 at each time instance. In one embodiment of the feedback scheme, the corrected CIR y(k) obtained using the proposed approach is fed back to the tracking loops 311 and replaces the CIR estimated using the standalone LTE receiver 310, which is used to produce measurements z'. Then, in one embodiment, the corrected measurements z' are fused in the navigation filter with a velocity random walk statistical model 320 as described for the feedforward coupling scheme.

Experimental Results 1

This section presents experimental results demonstrating the performance of the proposed LTE-SAN approach with both feedforward and feedback coupling versus that of a standalone LTE receiver.

Experimental Setup

The experiment of the first embodiments was conducted at the Engineering Gateway building at the University of California, Irvine, USA. The pedestrian-mounted receiver received signals from three U.S. cellular providers: T-Mobile, Verizon, and AT&T, transmitting at four different carrier frequencies, as summarized in Table I which shows exemplary LTE eNodeB characteristics.

TABLE I

LTE ENODEBS' CHARACTERISTICS

| eNodeB | Carrier frequency (MHz) | $N_{ID}^{Cell}$ | Bandwidth (MHz) | Cellular provider |
|---|---|---|---|---|
| 1 | 1955 | 93 | 20 | AT&T |
| 2 | 2125 | 223 | 20 | Verizon |
| 3 | 1955 | 11 | 20 | AT&T |
| 4 | 1955 | 198 | 20 | AT&T |
| 5 | 2145 | 112 | 20 | T-Mobile |
| 6 | 2112.5 | 401 | 20 | AT&T |

Figure 4A:
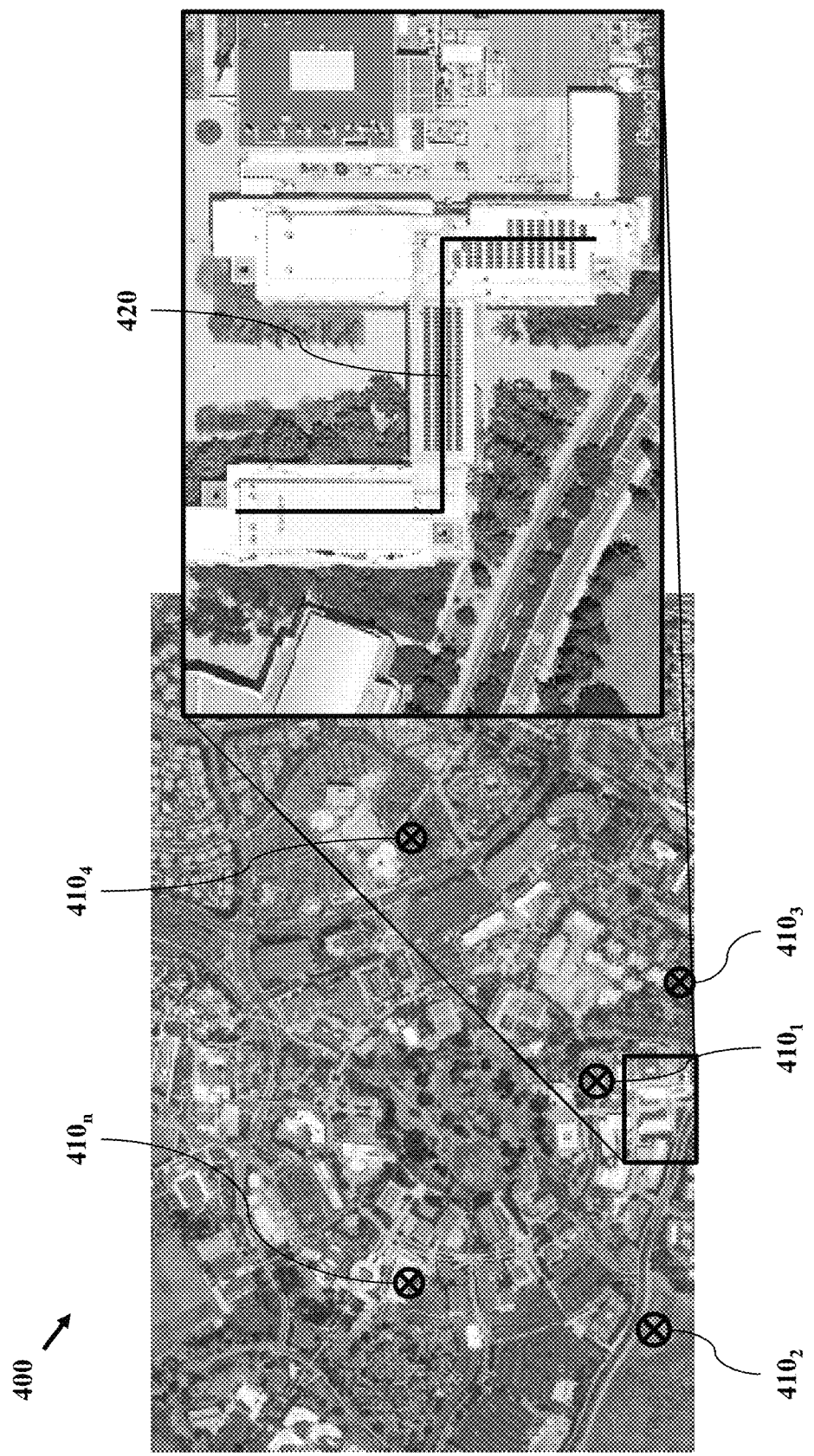
FIG. 4A illustrates a graphical representation of localization according to one or more embodiments.

FIG. 4A illustrates a graphical representation of localization according to one or more embodiments. In FIG. 4A, a top satellite view 400 of the positions of exemplary eNodeBs $410_{1-n}$ from which signals were collected and the building where the experiment was performed along with the ground truth trajectory 420 of the receiver is shown.

Figure 4B:
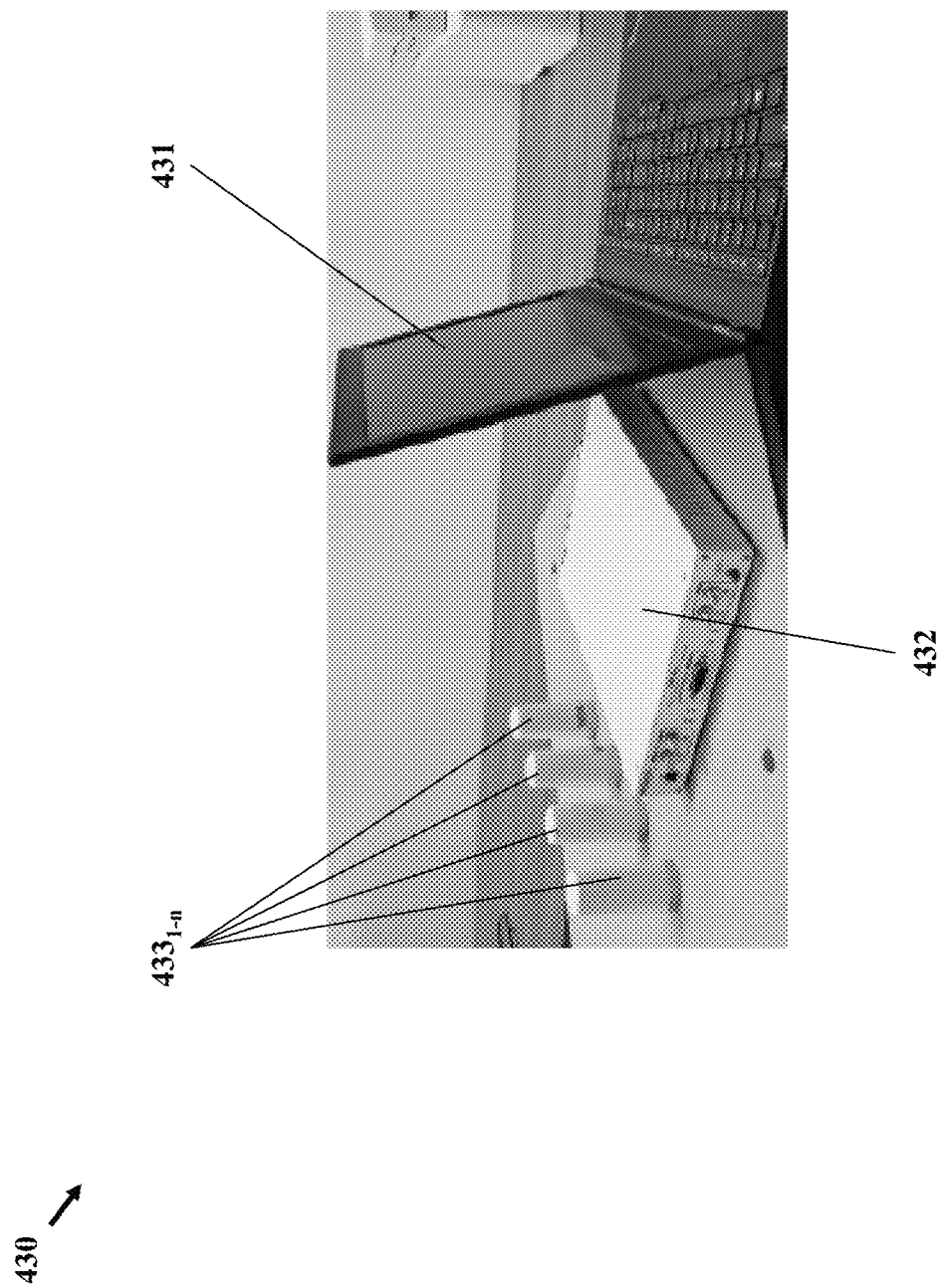

FIG. 4B is a perspective view of an exemplary embodiment of an indoors navigator experimental testbed according to one or more embodiments. Equipment configuration 430 may be employed for one or more processes and device configurations described herein. According to one embodiment, a receiver may be equipped with 4 consumer-grade cellular omnidirectional Laird antennas $433_{1-n}$ (2 antennas per carrier frequency) to collect data from the same carrier frequency, which were connected to a quad-channel National Instruments (NI) universal software radio peripherals (USRPs)-2955 432 to simultaneously down-mix and synchronously sample LTE signals at 10 Msps. The signals were processed in a post-processing fashion using MATLAB as run on a laptop 431.

Due to hardware limitations, LTE signals were collected in different runs, i.e, the same trajectory 420 was traversed two different times and for each run the receiver was tuned to two different carrier frequency. The position RMSE between trajectories from different runs referenced to the first trajectory was calculated to be 0.53 m. For each run, the receiver was equipped with 4 consumer-grade cellular omnidirectional Laird antennas $433_{1-n}$ (2 antennas per carrier frequency) to collect data from the same carrier frequency, which were connected to a quad-channel National Instruments (NI) universal software radio peripherals (USRPs)-2955 432 to simultaneously down-mix and synchronously sample LTE signals at 10 Msps. The signals were processed in a post-processing fashion using MATLAB as run on a laptop 431.

Filter Initialization

The pedestrian's 2-D position and velocity vector was initialized in this embodiment using a Gaussian random vector generator with a mean $x_{ped}(0)=[0, 0, 1.12, 0]$, which is the true initial state and the associated initial covariance matrix $P_{ped}(0)=\text{diag}[25, 25, 10, 10]$. The receiver's clock bias and drift were initialized using the receiver's initial position and two consecutive prior measurements, where their uncertainties were set to 25 m² and 0.1 (m/s)², respectively. The clock bias and drift process noise power spectra were set to $\{S_{\tilde{w}_{\delta t, u}}\}_{u=1}^{U=6}=4.7\times 10^{-20}$ and $\{S_{\tilde{w}_{\delta t, u}}\}_{u=1}^{U=6}=4.7\times 10^{-20}$, respectively. The measurement noise variance $\{\sigma^2_{v_u}\}_{u=1}^{U=6}$ were set to $$\left\{c^2 \frac{\alpha_u}{(C/N_0)_u}\right\}_{u=1}^{U=7},$$

respectively, where $(C/N_0)_u$ is the received carrier-to-noise ratio for the u-th eNodeB and $\{\alpha_u > 0\}_{u=1}^{U}$ are tuning parameters that were chosen to be {3.74, 2.53, 4.12, 5.87, 5.52, 8.94}×10⁻¹² in this embodiment.

Results 1

FIGS. 5A-5B illustrates graphic representations of ground truth trajectory compared to navigation solutions according to one or more embodiments. In FIG. 5A, pedestrian's ground truth trajectory is graphed compared to navigation solutions from: (1) standalone LTE, (2) an embodiment of a feedforward LTE-SAN framework, and (3) an embodiment of a feedback LTE-SAN framework.

In this experimental embodiment, the pedestrian navigated inside the Engineering Gateway building for 126.8 m in 100 seconds. The received LTE signals were processed off-line. The navigation filter in the "Extended Kalman Filter" section was used to obtain the navigation solution with the LTE measurements z and corrected LTE measurements z' from LTE-SAN. The ground truth of the experiment, shown as ground truch 420 in FIG. 4A, was obtained with a camera that was mounted on the moving cart, which was pushed by the pedestrian to record the location of specific landmarks in the environment with known locations. In one embodiment, the ground truth 420 is obtained by post-processing a video recorded by the mounted camera.

FIG. 5A shows the receiver's ground truth trajectory 501 versus the navigation solution from: (1) standalone LTE 502, (2) feedforward LTE-SAN framework 503, and (3) feedback LTE-SAN 504. Table II summarizes the experimental results and compares the results of a set of exemplary embodiments of indoor localization systems including an embodiment of a feedforward LTE-SAN framework, and an embodiment of a feedback LTE-SAN framework.

TABLE II

INDOOR LOCALIZATION PERFORMANCE COMPARISON

| Performance Measure [m] | Standalone LTE | Feedforward LTE-SAN | Feedback LTE-SAN |
| --- | --- | --- | --- |
| RMSE | 7.19 | 5.20 | 4.32 |
| Standard dev. | 3.32 | 2.92 | 1.41 |
| Max. error | 12.89 | 8.57 | 6.25 |

It can be seen that the proposed LTE-SAN framework outperforms the LTE standalone solution 502. Among the two LTE-SAN coupling methods of this section, it can be seen that the feedback LTE-SAN 504 outperforms feedforward LTE-SAN 503, especially over later time. This is justified from the fact that multipath introduces bias in the TOA update, which is used to convert the received LTE data into frame structure. The feedback LTE-SAN shares the corrections back with the LTE receiver and refines tracking parameters. However, in the feedforward LTE-SAN approach, the biases accumulate and the SAN may fail to resolve the introduced errors.

Experimental Results 2

In this section, the second proposed LTE-SAN framework is validated experimentally with LTE signals and compared with the performance of the standalone LTE receiver.

Experimental Setup and Environmental Layout

The experiment was performed at the Engineering Gateway building at the University of California, Irvine, USA. A quad-channel National Instrument (NI) universal software radio peripheral (USRP)-2955 232 was connected to the pedestrian-mounted receiver to sample LTE signals with a sampling rate of 10 MSps. Also, the receiver was equipped with 4 consumer-grade cellular omnidirectional Laird antennas 233$_{1-4}$. The USRP 232 was tuned to 4 different carrier frequencies and it was listening to 6 eNodeBs from 3 U.S. cellular providers as shown in FIG. 8/Table I. In one embodiment, the sampled LTE data were transferred from the USRP-2955 232 via a PCI Express cable and stored on a laptop 231 to be processed in a post-processing fashion using MATLAB. FIG. 4A shows the environment layout in which the experiment was performed and the positions of the eNodeBs from which signals were collected FIG. 4B shows the experimental hardware and software setup.

Navigation Solution

The experimental results showed the efficacy of the of the proposed LTE-SAN framework. The pedestrian traversed 126.8 m in 100 seconds. The pedestrian's position and velocity state vectors were initialized using a multi-variant Gaussian random generator with the true state vector $x_{ped}=$ [0, 0, 1.12, 0] as a mean and initial covariance matrix chosen to be $P_{ped}(0)=$diag[25, 25, 10, 10], which is reasonable assuming that GPS is available before entering the building and it provides a decent a priori. The initial position is used to initialize the relative clock biases with uncertainty 25 m². It is assumed that the receiver are the transmitters are equipped with oven-controlled crystal oscillator (OCXO) and temperature-compensated crystal oscillator (TCXO), respectively. The measurement noise covariance matrix was specified according to the received carrier-to-noise-ratio (CNR) of each signal at each time instance.

FIG. 5B illustrates an exemplary embodiment of a pedestrian's ground truth trajectory 505 versus navigation solution from: (1) standalone LTE 506 and (2) an embodiment of another LTE-SAN framework 507. It can be seen in Table III that the proposed LTE-SAN framework outperformed the LTE standalone solution with a position RMSE of 3.93 m versus 7.19 m respectively. The proposed LTE-SAN framework is validated experimentally and compared with the standalone LTE receiver, in which the pedestrian-mounted receiver navigated 126.8 m indoors in 100 seconds, while receiving LTE signals from 6 eNodeBs. The proposed framework exhibited a position root mean-squared error (RMSE) of 3.93 m compared to 7.19 m using the standalone LTE receiver. Table III compares the results of a set of exemplary embodiments of indoor localization systems including an embodiment of another LTE-SAN framework

TABLE III

INDOOR LOCALIZATION PERFORMANCE COMPARISON

| Performance Measure [m] | Standalone LTE | LTE-SAN |
| --- | --- | --- |
| RMSE | 7.19 | 3.93 |
| Standard deviation | 3.32 | 1.65 |
| Maximum error | 12.89 | 5.63 |

FIG. 6 is illustrates a process for a Multiple Signal Classification (MUSIC) according to one or more embodiments. Process 600 may include collecting data samples ($H^{(K)}$) at block 605 and estimating an input covariance matrix at block 610. At block 615, process 600 includes performing eigenvalue decomposition. At block 620, order of the system is estimated and the MUSIC spectrum is computed at block 625. At block 620, DOA estimates are obtained.

FIG. 7 illustrates a process for an exemplary estimation of signal parameters via rotational invariance techniques (ES-PRIT) function according to one or more embodiments. Process 700 may include collecting data samples ($H^{(K)}$) at block 705 and estimating an input covariance matrix at block 710. At block 715, process 700 includes estimating order of the system and a singular value decomposition is performed at 720. An invariance equation is solved at 725 and eigenvalues are calculated at 730. Angular information is extracted at 735 for estimated DOA.

CONCLUSION

This disclosure presents a practical and feasible approach to spatially separate LOS from multipath signals in a pedestrian indoor localization system that uses LTE carrier phase measurements. The four steps of performing a beamforming process were discussed: preprocessing filtering, model order estimation, DOA estimation, and weighting vector generation.

In one embodiment, two approaches to couple the SAN output with the LTE receiver are presented: feedforward and feedback. The performance of these coupling approaches versus a standalone LTE receiver was evaluated using real LTE data. The pedestrian traversed a distance of 126.8 m in 100 seconds while listening to LTE signals from 6 eNodeBs 410$_{1-n}$. The position RMSE exhibited by the proposed LTE-SAN approach was 5.20 m and 4.32 m with feedforward and feedback coupling, respectively, compared with 7.19 m with standalone LTE.

In another embodiment, the standard ESPRIT algorithm was applied to estimate DOA in the proposed LTE-SAN framework. An experiment was performed to show the power of the proposed framework, where the pedestrian traversed 126.8 m in 100 seconds while listening to 6 LTE cellular towers. The proposed LTE-SAN framework exhibited position RMSE of 3.93 m compared to 7.19 m which resulted using the standalone LTE receiver.

While this disclosure has been particularly shown and described with references to exemplary embodiments thereof, it will be understood by those skilled in the art that various changes in form and details may be made therein without departing from the scope of the claimed embodiments.

What is claimed is:

1. A method for carrier phase measurement and synthetic aperture navigation for an indoor localization system, the method comprising:
   receiving, by a device, a broadband communication signal from an antenna for a first position of the device;
   receiving, by the device, a broadband communication signal from the antenna for a second position of the device;
   processing, by the device, received broadband communication signals by performing a carrier phase measurements for each position of the device;
   determining, by the device, a direction of arrival (DOA) of received broadband communication signals relative to the antenna based on the processing and measurements for each position, wherein multipath error is suppressed based on determined (DOA) of received broadband communication signals, wherein determining direction of arrival (DOA) of received broadband communication signals includes estimating all paths from the receiver including line of sight and non-line of sight, selecting line of sight path, performing a beam forming operation to combine line of sight contributions and suppress multipath error and processing a beamformed signal to determine the navigation observable; and
   outputting, by the device, a navigation observable based on determined direction of arrival.

2. The method of claim 1, wherein broadband communication signals are cellular long-term evolution (LTE) signals, and wherein the broadband communication signal for the first position relates to a first time instant and the broadband communication signal for the second position relates to a second time instant.

3. The method of claim 1, wherein performing a carrier phase measurement includes tracking a cell-specific reference signal (CRS) in received frames of a broadband communication signal and estimating channel impulse response (CIR).

4. The method of claim 1, wherein suppressing multipath error includes steering an antenna array in a line of sight direction by maximizing signal-to-noise ratio.

5. The method of claim 1, wherein determining a direction of arrival (DOA) of received broadband communication signals includes performing a symmetric geometric pattern and invariance transformation including dividing a synthetic antenna array in to subarrays.

6. The method of claim 1, wherein determining a direction of arrival (DOA) of received broadband communication signals includes performing a spatial smoothing operation to divide a synthetic array into smaller subarrays and determining data covariance matrices from averaging of subarrays.

7. The method of claim 1, wherein multipath error is suppressed by applying a minimum variance distortionless (MVDR) beamformer operation.

8. The method of claim 1, wherein an extended Kalman filter (EKF) operation is performed to estimate a state vector from corrected carrier phase measurements.

9. The method of claim 1, wherein determining, by the device, a direction of arrival (DOA) of received broadband communication signals includes obtaining updated channel input response determination by at least one of a feedforward coupling scheme and feedback coupling scheme.

10. The method of claim 1, wherein the navigation observable is at least one of pseudorange and accumulated carrier phase.

11. A device configured for carrier phase measurement and synthetic aperture navigation for an indoor localization system, the device comprising:
    a communications module configured to
    receive a broadband communication signal from an antenna for a first position of the device, and
    receive a broadband communication signal from the antenna for a second position of the device; and
    a controller coupled to the communications module, wherein the controller is configured to
    process received broadband communication signals by performing a carrier phase measurements for each position of the device;
    determine a direction of arrival (DOA) of received broadband communication signals relative to the antenna based on the processing and measurements for each position, wherein multipath error is suppressed based on determined (DOA) of received broadband communication signals, wherein determining direction of arrival (DOA) of received broadband communication signals includes estimating all paths from the receiver including line of sight and non-line of sight, selecting line of sight path, performing a beam forming operation to combine line of sight contributions and suppress multipath error and processing the beamformed signal to determine the navigation observable; and
    output a navigation observable based on determined direction of arrival.

12. The device of claim 11, wherein broadband communication signals are cellular long-term evolution (LTE) signals, and wherein the broadband communication signal for the first position relates to a first time instant and the broadband communication signal for the second position relates to a second time instant.

13. The device of claim 11, wherein performing a carrier phase measurement includes tracking a cell-specific reference signal (CRS) in received frames of a broadband communication signal and estimating channel impulse response (CIR).

14. The device of claim 11, wherein suppressing multipath error includes steering an antenna array in a line of sight direction by maximizing signal-to-noise ratio.

15. The device of claim 11, wherein determining a direction of arrival (DOA) of received broadband communication signals includes performing a symmetric geometric pattern and invariance transformation including dividing a synthetic antenna array in to subarrays.

16. The device of claim 11, wherein determining a direction of arrival (DOA) of received broadband communication signals includes performing a spatial smoothing operation to divide a synthetic array into smaller subarrays and determining data covariance matrices from averaging of subarrays.

17. The device of claim 11, wherein multipath error is suppressed by applying a minimum variance distortionless (MVDR) beamformer operation.

18. The device of claim 11, wherein an extended Kalman filter (EKF) operation is performed to estimate a state vector from corrected carrier phase measurements.

19. The device of claim 11, wherein determining, by the device, a direction of arrival (DOA) of received broadband communication signals includes obtaining updated channel input response determination by at least one of a feedforward coupling scheme and feedback coupling scheme.

20. The device of claim 11, wherein the navigation observable is at least one of pseudorange and accumulated carrier phase.

* * * * *